(No Model.)
C. S. RAYMOND.
MILK CAN.
No. 315,835. Patented Apr. 14, 1885.
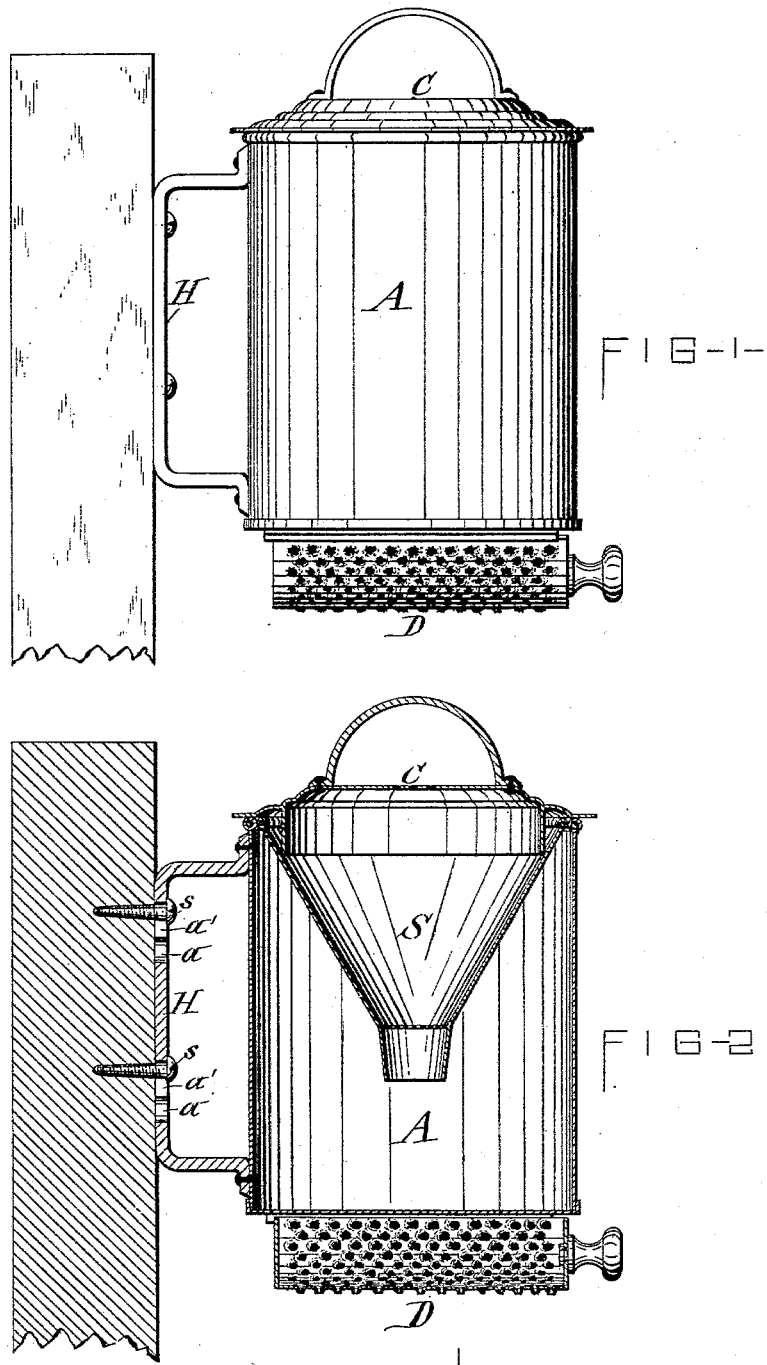
Fig-1-
Fig-3-
Fig-2-
ATTEST—
Wm. C. Raymond
C. H. Duell
INVENTOR—
Charles S. Raymond
per Duell, Laass & Hey
his Atty

UNITED STATES PATENT OFFICE.

CHARLES S. RAYMOND, OF OSWEGO, NEW YORK.

MILK-CAN.

SPECIFICATION forming part of Letters Patent No. 315,835, dated April 14, 1885.

Application filed February 12, 1885. (No model.)

*To all whom it may concern:*

Be it known that I, CHARLES S. RAYMOND, of Oswego, in the county of Oswego, in the State of New York, have invented new and useful Improvements in Milk-Cans, of which the following, taken in connection with the accompanying drawings, is a full, clear, and exact description.

This invention consists in a novel apparatus designed to enable the milk-peddler to expeditiously and conveniently deliver the milk to the customer and to collect his pay for the same, as hereinafter fully explained, and specifically set forth in the claims.

In the annexed drawings, Figure 1 is a side elevation of my invention. Fig. 2 is a vertical transverse section of the same, and Fig. 3 is a detached view of the handle of the apparatus.

Similar letters of reference indicate corresponding parts.

A represents the milk-receptacle provided with a handle, H, in which are two holes, $a\ a$, and slots $a'\ a'$ extending from said holes, said holes and slots allowing the receptacle to be readily hung on, and also readily removed from, two nails or screws, $s\ s$, secured a proper distance apart to a post or other suitable object easily accessible by the milk-peddler, the aforesaid attachment of the milk-receptacle being effected by slipping the holes $a\ a$ over the heads of the screws and then drawing the receptacle down to cause the shanks of the screws to enter the slots $a'\ a'$, the removal of the receptacle from its support being accomplished by reversing the aforesaid movements. Inside of the receptacle I prefer to place a milk-strainer, S, suspended from the top edge of the receptacle, as illustrated in Fig. 2 of the drawings, and on top of the receptacle is placed a removable cover, C, to exclude dust and rain or snow.

D denotes the holder for the milk-tickets. Said holder I prefer to make in the form of a drawer connected to the bottom of the milk-receptacle A, so as to protect the tickets as much as possible from the weather, and in order to guard against the injury to the tickets by water, which may accidentally enter the drawer when the apparatus is exposed to the rain, I perforate the drawer D, as shown.

The utility and convenience of my invention is apparent. The person purchasing milk deposits the milk-tickets in the drawer D and places the latter in position under the milk-receptacle A, and then hangs the latter on the nails or screws $s\ s$, which may be secured either to a post or to the outside of the door, or to a tree near the roadway, or to some other suitable object conveniently accessible by the milk-peddler, who takes the tickets from the drawer and puts into the milk-receptacle A the amount of milk called for by the tickets, and leaves said receptacle, with its contents, suspended from the nails or screws $s\ s$, ready to be taken by the customer, the strainer S straining the milk as it is introduced into the milk-receptacle A.

Having described my invention, what I claim as new, and desire to secure by Letters Patent, is—

1. The combination, with a milk-receptacle, of a handle by which to suspend it, and a drawer connected to the bottom of the receptacle, and perforated, substantially as and for the purpose set forth.

2. The within-described apparatus for receiving milk from the peddler and for paying for the milk, consisting of the pail A, having the handle H, provided with holes $a\ a$, and slots $a'\ a'$ extending from said holes, the cover C upon the pail, and the drawer D on the bottom of the pail, all combined substantially as described and shown, for the purposes specified.

In testimony whereof I have hereunto signed my name and affixed my seal, in the presence of two attesting witnesses, at Syracuse, in the county of Onondaga, in the State of New York, this 17th day of January, 1885.

CHARLES S. RAYMOND. [L. S.]

Witnesses:
C. BENDIXON,
FREDERICK H. GIBBS.